United States Patent
Hosseini Kouh Kamari et al.

(10) Patent No.: US 12,045,271 B1
(45) Date of Patent: Jul. 23, 2024

(54) METHODS AND SYSTEMS FOR FACILITATING THE CREATION OF FOOD AND/OR BEVERAGE PRODUCT CONCEPTS

(71) Applicant: Société des Produits Nestlé S.A., Vevey (CH)

(72) Inventors: Seyed Reza Hosseini Kouh Kamari, Saint-Sulpice (CH); Xiaoqing Xu, Lausanne (CH); Rafael Pinto Peixoto, Lausanne (CH); Stéphanie Mehlinger, Lausanne (CH); Amanda Makhpal Talhat, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/373,502

(22) Filed: Sep. 27, 2023

(51) Int. Cl.
*G06F 16/33* (2019.01)
*G06F 16/35* (2019.01)

(52) U.S. Cl.
CPC ........ *G06F 16/3344* (2019.01); *G06F 16/353* (2019.01)

(58) Field of Classification Search
CPC .......................... G06F 16/3344; G06F 16/353
USPC ......................................................... 707/708
See application file for complete search history.

(56) References Cited

U.S. PATENT DOCUMENTS

| | | | | |
|---|---|---|---|---|
| 8,180,760 B1 * | 5/2012 | Carver | ................. | G06F 16/355 707/708 |
| 8,290,975 B2 * | 10/2012 | Gao | ................... | G06F 16/3322 707/750 |
| 8,972,404 B1 * | 3/2015 | Lewis | ................... | G06F 16/355 707/738 |
| 9,626,455 B2 * | 4/2017 | Miller | ................... | G06F 16/248 |
| 10,162,900 B1 | 12/2018 | Chatterjee et al. | | |
| 2007/0271266 A1 * | 11/2007 | Acharya | ................ | G06N 5/022 |

(Continued)

OTHER PUBLICATIONS

European Office Action for Appl No. 23200083.6-1203 dated Feb. 29, 2024.

*Primary Examiner* — Cam Linh T Nguyen
(74) *Attorney, Agent, or Firm* — K&L Gates LLP

(57) ABSTRACT

A computer-implemented method for facilitating the creation of food and/or beverage product concepts, comprising: providing a plurality of content items obtained from one or more sources, each content item comprising structured or unstructured text, at least one of the content items comprising text that pertains, at least in part, to one or more food and/or beverage products, assigning, to each content item, one or more taxonomic labels, wherein each label comprises a term contained in a pre-defined taxonomy of terms and each label assigned to a respective content item is selected based on the particular language used in the respective content item, receiving, from a user, a query specifying a first term; in the event that the first term comprises a taxonomic label from the pre-defined taxonomy of terms; identifying one or more pairs of terms, each pair of terms comprising the first term and a respective other one of the taxonomic labels; determining, for each pair of terms, an association score, wherein the association score is based at least in part on the number of content items that have been assigned both of the taxonomic labels in the pair; and outputting, in a user-interface, a response to the query, wherein the response provides an indication of the association score(s) for each pair of terms.

14 Claims, 11 Drawing Sheets

(56) References Cited

U.S. PATENT DOCUMENTS

| | | | | |
|---|---|---|---|---|
| 2018/0032678 A1* | 2/2018 | Dandala | .................. | G16H 50/70 |
| 2018/0046983 A1* | 2/2018 | Sheth | .................. | G06K 7/10861 |
| 2018/0047081 A1* | 2/2018 | Sheth | .................... | G06Q 10/10 |
| 2018/0322511 A1* | 11/2018 | Sheth | .................. | G06V 30/413 |
| 2018/0322512 A1* | 11/2018 | Sheth | .................... | G06F 16/583 |
| 2019/0290172 A1* | 9/2019 | Hadad | .................. | A61B 5/0022 |
| 2021/0398449 A1* | 12/2021 | Banavar | ............... | C12Q 1/6869 |
| 2022/0399098 A1 | 12/2022 | Zhang | | |
| 2023/0034911 A1* | 2/2023 | Karlberg | .................. | G09B 5/02 |
| 2023/0054187 A1* | 2/2023 | Das | ..................... | G06F 16/9535 |

* cited by examiner

| | |
|---|---|
| We had so much chocolate left over after my birthday party. I had to eat it all or let it go to waste – so much for my new year's resolution to lose weight!<br>401a | Ingredients [Chocolate]<br>Consumption occasions [Birthday]<br>Mental/physical needs [Weight-management]<br>401b |
| Hi all, just an update - doctors finally explained why I've had all his tiredness lately – they've told me I'm diabetic so will pay attention to what I'm eating.<br>403a | Ingredients ------<br>Consumption occasions ------<br>Mental/physical needs [Tiredness, Diabetes]<br>403b |
| Is it just me, or do others find they always gain weight in winter?<br>405a | Ingredients ------<br>Consumption occasions [Winter]<br>Mental/physical needs [Weight-management]<br>405b |
| Although I'm diabetic, my mum always lets me have chocolate or ice cream on my birthday as a treat.<br>407a | Ingredients [Chocolate, Ice cream]<br>Consumption occasions [Birthday]<br>Mental/physical needs [Diabetes]<br>407b |
| Just realised it's my cousin's wedding next month and I'm stressing because I don't fit in my suit trousers – any tips how to lose a few lbs quickly?<br>409a | Ingredients ------<br>Consumption occasions [Wedding]<br>Mental/Physical needs [Weight-management, Stress]<br>409b |
| Been so stressed at work this week – can't wait for my holiday to begin and my first ice cream of the year!<br>411a | Ingredients [Ice cream]<br>Consumption occasions [Holiday]<br>Mental/physical needs [Stress]<br>411b |

Fig. 4A

| | |
|---|---|
| Hi all, just back from my hols, had a fantastic time, as you can see from my increased waist line!<br>413a | Ingredients       ------<br>Consumption occasions   [Holiday]<br>Mental/physical needs   [Weight-management]<br>413b |
| Since I started eating papaya for breakfast, it's really helped me to slim down.<br>415a | Ingredients       [Papaya]<br>Consumption occasions   ------<br>Mental/physical needs   [Weight-management]<br>415b |
| I have diabetes so am trying to eat more healthily. Is there somewhere I can buy sugar-free chocolate that tastes good?<br>417a | Ingredients       [Chocolate, Sugar]<br>Consumption occasions   ------<br>Mental/physical needs   [Diabetes]<br>417b |
| Tried out this new recipe today. Lettuce and tomato with papaya dressing. Sounds odd but tastes great and is great for keeping weight down.<br>419a | Ingredients       [Lettuce, Tomato, Papaya]<br>Consumption occasions   ------<br>Mental/physical needs   [Weight management]<br>419b |
| I've read that weight gain can increase the risk of diabetes – I'm going to try to avoid too much chocolate and sugar from now on!<br>421a | Ingredients       [Chocolate, Sugar]<br>Consumption occasions   ------<br>Mental/physical needs   [Weight management; Diabetes]<br>421b |
| Started my new diet today, in hope of losing weight; a little less bacon and more lettuce, wish me luck!<br>423a | Ingredients       [Bacon, Lettuce]<br>Consumption occasions   ------<br>Mental/physical needs   [Weight management]<br>423b |

Fig. 4B

| | |
|---|---|
| Franks the Chocolatiers in Main Street sells the best chocolate. I always go there on my birthday, but most days I try to walk home a different route just to avoid temptation – and weight-gain!  425a | Ingredients          [Chocolate]<br>Consumption occasions  [Birthday]<br>Mental/physical needs   [Weight-management]  425b |
| When it comes to ice cream, chocolate is by far and away the most popular flavour. Today, there are lots of low-sugar varieties to choose from.  427a | Ingredients          [Ice cream, Chocolate, Sugar]<br>Consumption occasions  ------<br>Mental/physical needs   ------  427b |
| Anyone else heard about papaya being good for weight loss? I've heard lots of celebrities saying they eat it every day  429a | Ingredients          [Papaya]<br>Consumption occasions  ------<br>Mental/physical needs   [Weight-management]  429b |
| Just moved in my new apartment, and the café downstairs does the best bacon lettuce and tomato I've tasted!  431a | Ingredients          [Bacon, Lettuce, Tomato]<br>Consumption occasions  -----<br>Mental/physical needs   -----  431b |

Fig. 4C

| Associated Labels(s) | Number of hits ||| Association score |
|---|---|---|---|---|
| | Positive association | Neutral association | Negative association | |
| Weight management | 2 | 0 | 3 | 7 |
| Sugar | 0 | 0 | 3 | 3 |
| Stress | 0 | 2 | 1 | 3 |

Fig. 6

| Filter(s) | Ingredients |
|---|---|
| 1. Diabetes | 1 Chocolate<br>2 Sugar<br>3 Ice cream |
| | Consumption Occasions |
| | 1. Birthday |
| | Mental/Physical Needs |
| | 1 Weight management<br>1 Tiredness<br>3 Stress |

Fig. 7

| Filter(s) | Ingredients |
|---|---|
| 1. Diabetes [OR]<br>2. Weight management | 1   Chocolate<br>2   Papaya<br>3   Sugar<br>4   Lettuce<br>5   Biscuits<br>6   Ice cream<br>7   Bacon<br>8   Tomato |
| | Consumption Occasions<br><br>1   Birthday<br>2   Holiday<br>3   Wedding<br>4   Winter |
| | Mental/Physical Needs<br><br>1   Tiredness<br>2   Stress |

Fig. 8

| | |
|---|---|
| Insight | It's finally Christmas time, which means it's time for hot chocolate. However, I love drinking a lot of hot chocolate during the day so it makes me always feel guilty, especially this year, since my doctor told me to keep an eye on my sugar consumption and eat more fruits if I have a craving for something sweet. I wish there would be a guilt-free hot chocolate which would make me and my doctor happy. |
| Product Description Benefits | Discover the new Papaya Infused Hot Chocolate, a sugar free Hot Chocolate with papaya extract. Whether you're watching your weight or your blood sugar levels or simply looking for a vitamin boost during winter, our delicious Papaya Infused Hot Chocolate is the perfect choice. |
| Reason to believe | Because papayas are a rich source for Vitamins and have a low impact on blood sugar levels. Combined with our sugar-free hot chocolate mix based on dark chocolate, our product is suitable for individuals looking to manage their sugar intake or weight. |

Fig. 9

METHODS AND SYSTEMS FOR FACILITATING THE CREATION OF FOOD AND/OR BEVERAGE PRODUCT CONCEPTS

FIELD

Embodiments described herein relate to methods and systems for analysing content items and leveraging this analysis to develop or renovate consumer good product concepts, and in particular, food or beverage product concepts.

BACKGROUND

Social listening is widely used for understanding a company or brand's performance in the market or for identifying trends, needs or gaps in relation with a specific topic. By reviewing content items, such as those posted on social media websites, for example, it is possible to ascertain people's thoughts and opinions about a wide range of topics or products, including different food and beverage products. The knowledge so obtained can be leveraged towards developing food, beverage products that better align with people's needs and which are more likely to be enjoyed by those people.

To date, analysis of social listening platforms has largely relied on manual interpretation of the content of websites, including people's posts and comments. Whilst such analysis can be used to visualise broad trends in sentiment towards different foods and/or beverages products, people's preferences will typically be driven by more than one factor (age, geography, etc.). Identifying connections between these underlying factors can prove challenging if relying on manual assessment alone. The growth in artificial intelligence (AI) systems offers new opportunities for identifying such connections at a deeper level, but such systems encounter difficulties in formulating results in a manner that a product or concept developer can easily understand and interact with when developing/designing new product concepts or when renovating pre-existing product concepts. Such systems also have been unable to draw together the various product concept dimensions (e.g. ingredients, product format, sensory characteristics, proposed benefits to health etc.) as required to facilitate the generation of new product concepts for foods and beverages.

SUMMARY

According to a first aspect of the present invention, there is provided a computer-implemented method for facilitating the creation of food and/or beverage product concepts, the method comprising:
 providing a plurality of content items obtained from one or more sources, each content item comprising structured or unstructured text, at least one of the content items comprising text that pertains, at least in part, to one or more food and/or beverage products;
 assigning, to each content item, one or more taxonomic labels, wherein each label comprises a term contained in a pre-defined taxonomy of terms and each label assigned to a respective content item is selected based on the particular language used in the respective content item;
 receiving, from a user, a query specifying a first term;
 in the event that the first term comprises a taxonomic label from the pre-defined taxonomy of terms;
 identifying one or more pairs of terms, each pair of terms comprising the first term and a respective other one of the taxonomic labels;
 determining, for each pair of terms, an association score, wherein the association score is based at least in part on the number of content items that have been assigned both of the taxonomic labels in the pair; and
 outputting, in a user-interface, a response to the query, wherein the response provides an indication of the association score(s) for each pair of terms.

In the event that the first term in the query does not comprise one of the taxonomic labels in the pre-defined taxonomy, the method may comprise:
 identifying one or more of the content items to which the first term is relevant, based on the particular language used in the respective content item;
 identifying one or more pairs of terms, each pair of terms comprising the first term and a respective one of the taxonomic labels;
 for each pair of terms, determining an association score, the association score being based at least in part on the number of content items to which the first term has been identified as relevant and which have been assigned the taxonomic label contained in the pair; and
 outputting, in the user-interface, a response to the query, wherein the response provides an indication of the association score(s) for each pair of terms.

The method may comprise identifying, for each of the taxonomic labels, a broadest class of terms in the pre-defined taxonomy to which the taxonomic label belongs;
 wherein when outputting the response to the query, the taxonomic labels in each pair of terms are sorted into groups based on the larger class of labels to which they belong.

The pre-defined taxonomy may comprise a plurality of taxonomic structures, each structure comprising a hierarchy of terms, wherein the terms in the respective taxonomic structures pertain to one or more of:
 Ingredients;
 Consumption Occasions;
 Mental or physical needs;
 Product Formats;
 Packaging Formats;
 Sensory Characteristics; and
 Geographical locations.

The response may include, for each taxonomic label contained in a respective one of the pairs of terms, both an indication of the taxonomic label and the association score between the label and the first term.

The method may comprise:
 constructing a knowledge graph, wherein the knowledge graph comprises two or more nodes and one or more edges, each node being associated with a respective label in the pre-defined taxonomy of terms, each edge connecting a respective pair of nodes whose labels are both applied to a same one of the content items, each edge indicating the association score for the labels associated with the nodes in the pair;
 wherein outputting the response to the query comprises identifying a first node that is associated with the first label, and one or more other nodes that are connected to the first node by an edge; and
 determining the association scores for the edges connecting the first node with the one or more other nodes.

The method may comprise:
 receiving, from a user, a selection of one of the pairs of labels having an association score; and retrieving, for display to the user, one or more of the content items to which both labels in the pair of labels were assigned.

The method may comprise:

receiving, over time, a further plurality of content items;

assigning one or more of the labels in the taxonomy to each one of the further plurality of content items; and updating the association score(s), based on the labels assigned to the further plurality of content items.

The method may comprise:

outputting, for each pair of terms, an indication of a change in the association score(s) to have occurred over a defined period of time.

The plurality of content items may be obtained from one or more of:

social media sites;
news websites;
blogs,
review websites;
video or picture websites;
scientific publication websites or repositories;
web forums,
internally available documentation, and
bulletin board systems (BBS).

The method may comprise generating a product concept, in particular a food and/or beverage product concept, the product concept comprising a description of a food and/or beverage product incorporating one or more ingredients associated with the labels output in the response.

The product concept, in particular the food and/or beverage product concept, may be generated at least in part using a large language model LLM, the labels output in the response being used as input to the LLM.

According to a second aspect of the present invention, there is provided a computer system comprising one or more processors configured to carry out a method according to the first aspect of the present invention.

According to a third aspect of the present invention, there is provided a computer-readable medium storing computer executable instructions that when executed by a computer will cause the computer to carry out a method according to the first aspect of the present invention.

BRIEF DESCRIPTION OF DRAWINGS

Embodiments of the invention will now be described by way of example with reference to the accompanying drawings in which:

FIGS. 4A-4C show examples of content items having been labelled using taxonomic labels according to an embodiment;

FIG. 6 shows an example of how association scores between nodes in the knowledge graph of FIG. 5 may be calculated; and FIG. 7 shows information displayed in a user-interface obtained by probing the knowledge graph of FIG. 5;

FIG. 8 shows information displayed in the user-interface obtained by further probing the knowledge graph of FIG. 5; and FIG. 9 shows an example product concept as may be obtained using embodiments described herein.

DETAILED DESCRIPTION

Figure 1:
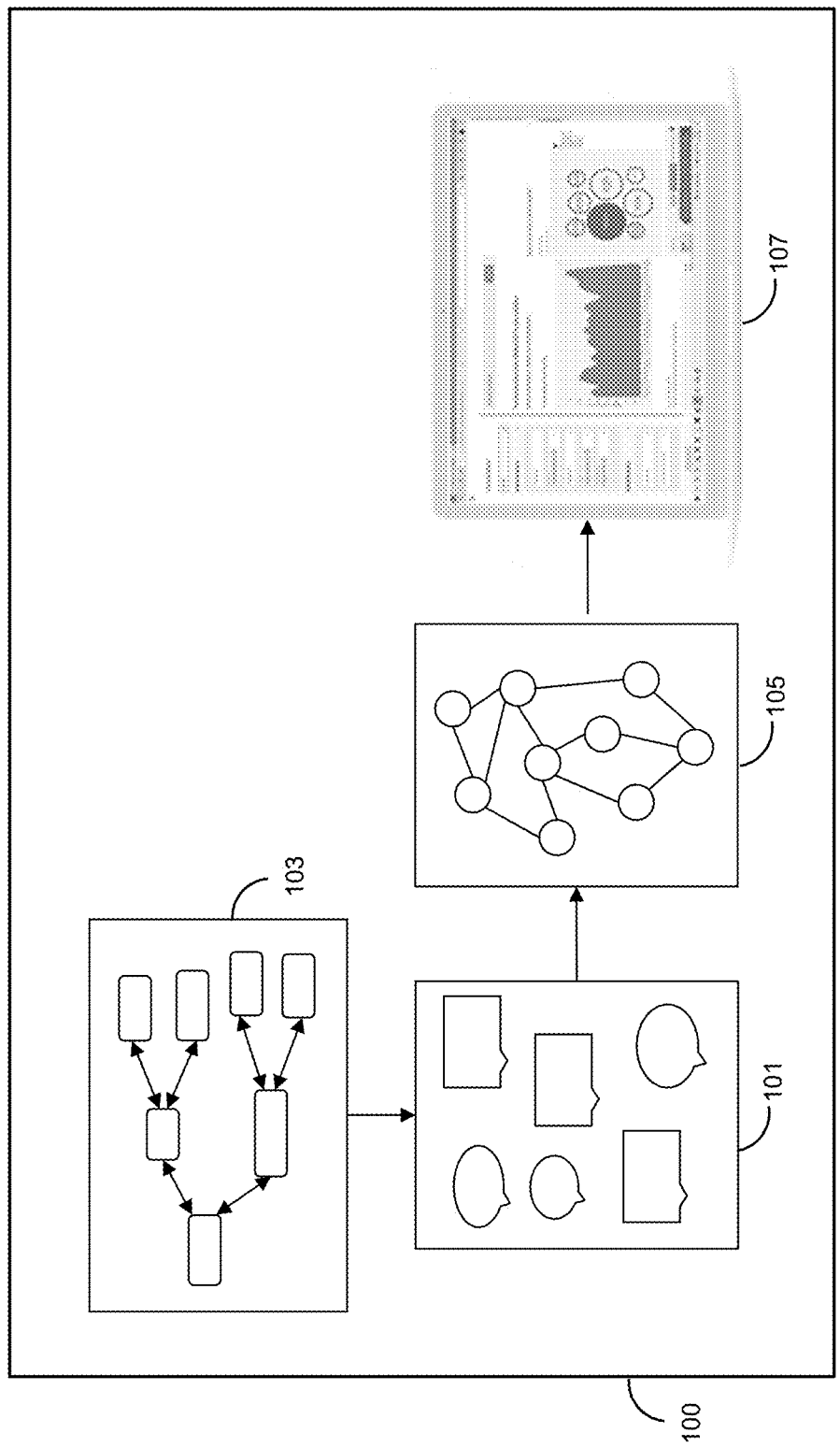
FIG. 1 shows a schematic of a system according to an embodiment.

As used herein, the words "comprise", "comprising" and the like are to be construed in an inclusive sense, that is to say, in the sense of "including, but not limited to", as opposed to an exclusive or exhaustive sense. Likewise, the terms "include," "including" and "or" should all be construed to be inclusive, unless such a construction is clearly prohibited from the context. Nevertheless, the systems, products and methods disclosed herein may lack any element that is not specifically disclosed herein. Thus, a disclosure of an embodiment using the term "comprising" includes a disclosure of embodiments "consisting essentially of" and "consisting of" the components identified.

As used in the specification, the singular forms "a", "an", and "the" include plural referents unless the context clearly dictates otherwise. Thus, for example, reference to "a term" or "the term" includes one term but also two or more terms. Unless defined otherwise, all technical and scientific terms have and should be given the same meaning as commonly understood by one of ordinary skill in the art to which this invention belongs.

As used herein, the term "and/or" used in the context of "X and/or Y" should be interpreted as "X," or "Y," or "X and Y.". Similarly, "at least one of X or Y" should be interpreted as "X," or "Y," or "both X and Y.". For example, "food and/or beverages" means "food," or "beverages," or "both food and beverages".

As used herein, the terms "example", "such as" and "e.g." particularly when followed by a listing of terms, are merely exemplary and illustrative and should not be deemed to be exclusive or comprehensive. But, a disclosure of an embodiment using the term "example" and "such as" includes a disclosure of embodiments where the terms are exclusive and/or comprehensive.

As used herein, the singular forms "a", "an", and "the" include plural referents unless the context clearly dictates otherwise. Thus, for example, reference to "a node" or "the node" includes one node but also two or more nodes.

As used herein, the term "beverage product" and "drink" refers to mean a product or composition any product or composition that is intended for ingestion by an individual such as a human or non-human animal (e.g. pet) and provides at least one nutrient to the individual and that is generally consumed by drinking.

As used herein, the term "food product" refers to mean any product or composition, different than "beverage" and "drink" that is intended for ingestion by an individual such as a human or non-human animal (e.g. pet) and provides at least one nutrient to the individual. For avoidance of doubt, the term "food product" also include pet foods and nutritional products. The nutritional products may be selected from the list consisting of food or dietary supplements, nutritional compositions, complete nutritional compositions, pharmaceuticals, oral nutritional supplement, medical food, nutraceuticals, powdered nutritional products to be reconstituted in water or milk before consumption, infant formula, food for special medical purpose (FSMP), medicaments, infant formulas, baby food, follow-on formulas.

As used herein, the term "Ingredients" refers to compounds, such as biological, mineral or chemical compounds or combination of such compounds (e.g. mixture, blend, semi-finished product etc.), that may be used in the formulation of products, in particular food or beverage products.

As used herein, the term "Consumption Occasions" refers to occasions, such as event, moment, during which a product, in particular food or beverage product, is consumed. An example of a consumption occasion is breakfast.

As used herein, the term "mental or physical needs" relates to needs in relation with the mental and physical elements, status and/or conditions of a subject, in particular human or a non-human animal, such as pet. For example, the mental or physical needs may be related to the maintenance, the improvement, the reduction, the correction, the removal, the addition, the replacement, the curing and/or the prevention of mental and physical elements, status and/or conditions of a subject, in particular human or a non-human animal, such as pet. For example, physical needs may be immunity enhancement, fatigue reduction or body weight maintenance. For example, mental needs may be mood improvement or indulgence enhancement.

As used herein, the terms "mental or physical needs" and "mental/physical needs" are used interchangeably.

As used herein, the term "product format" refers to the form (e.g. beverage, powder, spoonable etc.), type (e.g. fermented, . . . ), and storage condition (e.g. ambient, frozen, chilled etc.) of the product, in particular food or beverage product.

As used herein, the term "Packaging format" refers to information (e.g. material, shape, packaging type etc.) related to the packaging (e.g. bottle, split pot etc.) or to other packaging format alternative (e.g. bulk) in which the product, in particular food or beverage product is provided.

As used herein, the term "Sensory" refers to information related to the texture, the taste, the flavor, the odor, the senstation, the smell and the appearance of the product, in particular food or beverage product.

As used herein, the term "Geographical locations" refers to any types of geographical locations regardless the scale. As non-exhaustive examples, this can refer to continents (e.g. European continent etc.), geographical regions (e.g. South America etc.), countries (e.g. France), cities (e.g. Paris, Chateaurenard etc.), places (e.g. household, cinema, school etc.), geographical structure (e.g. island, mountain, etc.), geographical subdivision (e.g. French speaking countries etc.).

FIG. 1 shows a schematic of a system 100 according to an embodiment. The system comprises a pipeline of components that together can assist a product or concept developer in generating new concepts for product development or product renovation by providing relevant and data-driven insights. Given a partially defined concept scope (market, topic, ingredients, reason to believe, mental/physical needs, persona, product format, product category, consumer pain and benefit), the system can be used to help the product or concept developer refine the scope until the product concept is fully developed. As shown in FIG. 1, the system comprises a content analyser 101, a taxonomy generator 103, a knowledge graph generator 105 and a user interface 107.

Figure 2:
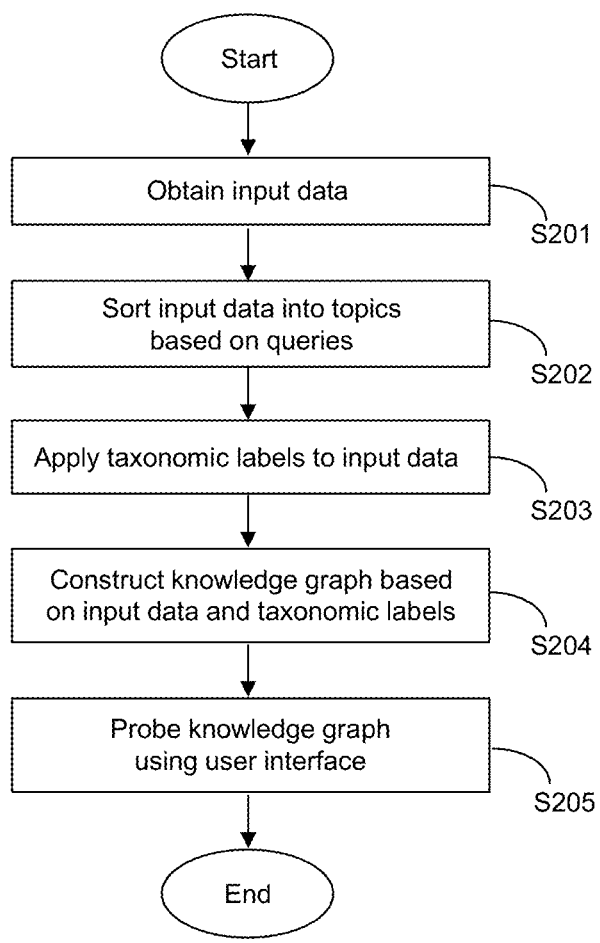
FIG. 2 shows a sequence of steps as carried out by the system of claim 1, according to an embodiment.

The roles of each component of FIG. 1 can be further understood with reference to FIG. 2, which shows a sequence of steps carried out by the different components. In step S201, the content analyser receives input data in the form of content items. The content items may be obtained from multiple sources and include content published e.g. on social media, news websites, blogs, forums, scientific publications, and bulletin board systems (BBS) etc., as well as other internally available documentation (i.e. online or non-online documentation, preferably non-online documentation which is available to a restricted number of people). The content items may be provided in the form of text, either structured or unstructured, and may be available from one or more databases of information. The content may originate from non-textual sources, such as audios, videos or images. But, in the case of non-textual source, a text transcript of the non-textural source, such as audio transcript, is provided as content item in the computer-implemented method. In a preferred embodiment, the media content items include online media content items. More preferably, the online media content items include one or more online media content items selected from the list consisting of messages and questions posted on social medial websites, content and comments published on blogs, messages and questions posted on forums, text of scientific publication database, content of bulletin board systems and combination thereof.

In step S202, a pre-processing step is carried out in which the content items are sorted into topics by high-level analysis of the language contained therein. For example, the content items may be processed to separate and discard ones that are deemed to have no relevance to food and/or beverages. The remaining topics may be further classified into different sub-topics, such as vegan/vegetarian or toddler nutrition, for example. It will be appreciated that step S202 is an optional step, and in some embodiments, this initial pre-processing stage may be omitted, depending on the nature and scope of the input content items received by the content analyser 101.

In step S203, the content analyser 101 further processes each content item using one or more Natural language processing (NLP) algorithms, such as Bert embedding, UMAP, HDBSCAN, for example. The NLP algorithm(s) may use a combination of syntax and semantic analysis to identify words and terms that appear in each content item and extract the meaning of those terms in the context of the content item as a whole. The NLP algorithm may also analyse the relationships between different words; for example, a content item that specifies that "chocolate can help improve mind-set" may be interpreted to mean that "chocolate" has a positive relationship with "mind-set".

Having carried out the semantic analysis of the input media content items, the content analyser labels the various terms within each media content item using a taxonomy provided by the taxonomy generator. As discussed in more detail below, the taxonomy comprises a hierarchy of terms that enables the system to identify different terms used throughout the media content items as belonging to one or more classes of elements.

In step S204, having tagged the content items with the taxonomic labels, the labelled posts are used by the knowledge graph generator 105 to compile a knowledge graph 105. The knowledge graph uses the information contained in the individual content items, together with the taxonomic labels applied to each content item, to form associations between different terms and at the same time to distinguish terms that are more strongly associated with one another from ones having a weaker or more superficial connection. The knowledge graph, in effect, provides a repository of information that can be probed by a product or concept developer (step S205) in order to understand which elements and concepts are more closely associated with one another and should be taken into consideration when developing/designing product concepts or renovating pre-existing product concepts in relation to a specific topic. As mentioned above, the knowledge graph is built based on a large volume of data that may include both publicly available and non-publicly available content containing information about consumer needs, their preferences and pain points. The knowledge graph will continue to evolve over time. Since the data on which the knowledge graph is based includes data reflecting people's mind, preferences, emotions and spontaneous opinions on a specific topic, the knowledge graph provides key elements/concepts association(s) that cannot be easily identified using conventional methods based solely on human assessment. These elements and concept associations can then be taken into consideration when developing/designing product concepts or renovating pre-existing product concepts in relation to a specific topic.

Figure 3:
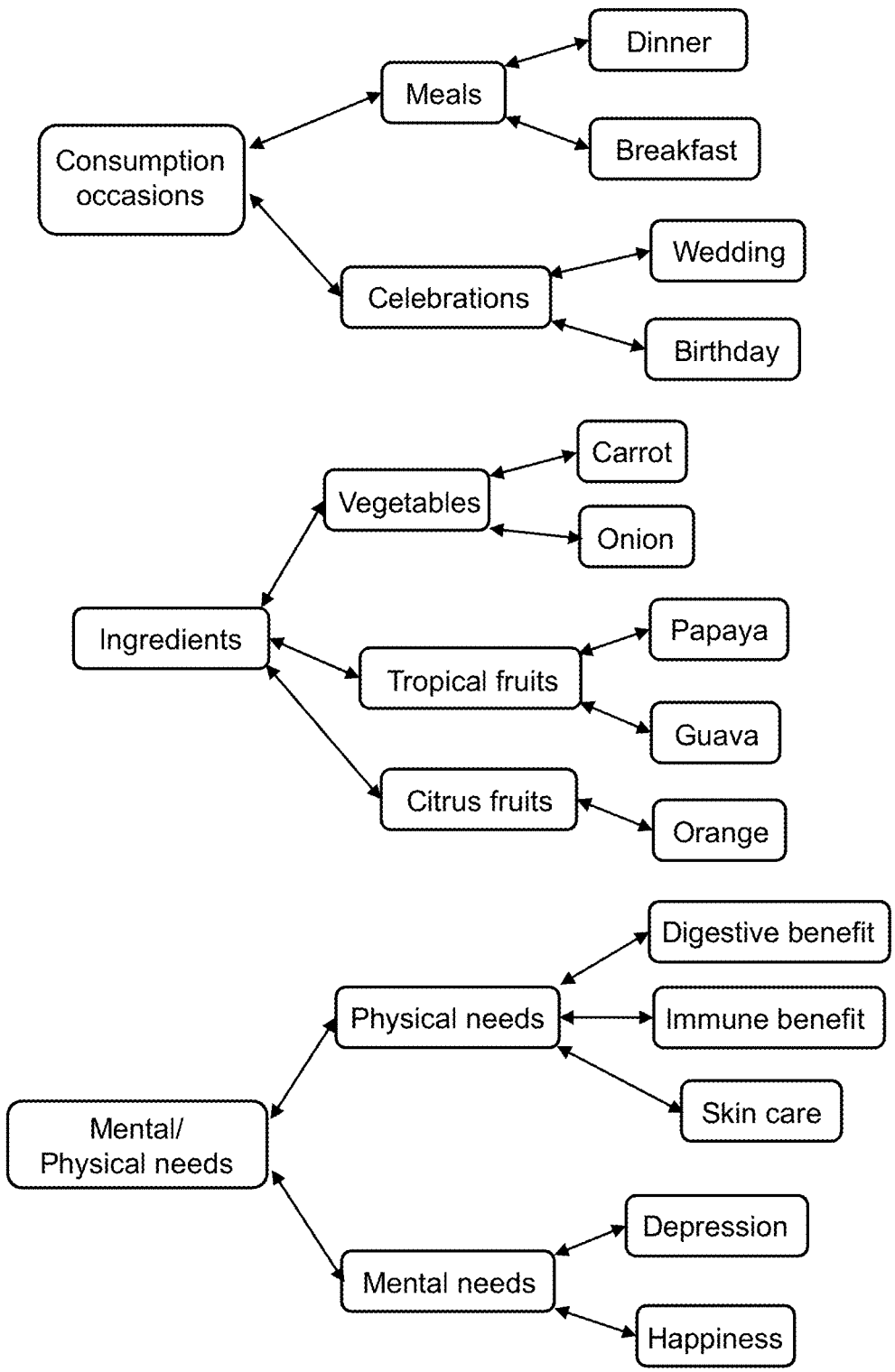
FIG. 3 shows an example taxonomy as used to label content items in an embodiment.

FIG. 3 shows an example taxonomy as provided by the taxonomy generator 103. The taxonomy itself is formed of a series of different taxonomic structures, where each structure defines a hierarchy of terms associated with a particular dimension for a product concept. Such dimensions may include, for example, "Ingredients", "Consumption Occasions", "Mental/Physical Needs" etc. As an example, referring to FIG. 3, the taxonomic structure for "Ingredients" includes the terms "Papaya" and "Guava"; these terms fall within the sub-class of "Tropical Fruits", which itself falls within the broadest class of "Ingredients" along with "Vegetables" and "Citrus Fruits".

It will be appreciated that the individual taxonomic structures may be combined within a single structure or stored as wholly separate structures. For example, with reference to FIG. 3, the three taxonomic structures shown have "Consumption occasions", "Ingredients" and "Mental/Physical Needs" as their broadest class, respectively. Each one of these taxonomic structures may be stored and/or accessed separately from one another; alternatively, the three taxonomic structures shown in FIG. 3 may be comprised as part of a single taxonomic database.

FIGS. 4A-4C show examples of how individual content items—in this case, posts on one or more social media websites—may be labelled using the taxonomy. Although the items 401a-431a each represent a particular post gathered from a social media website, it will be appreciated that these items may be obtained from a host of other online sites, including blogs, web-forums and news websites, etc. In each case, the content analyser is able to recognise the presence of certain words or phrases within the post and to tag those words with labels from one or more taxonomic structures such as the ones shown in FIG. 3. By doing so, the content analyser is able to generate a plurality of label groupings 401b-431b, where each label grouping records the list of taxonomic labels that are applied to a respective one of the content items 401a-431a. For example, in the case of the first post 401a, the content analyser 101 is able to determine that the term "Chocolate" is contained within the taxonomic structure for "Ingredients", whilst "Birthday" is within the taxonomic structure for "Consumption Occasions" and "Weight-Management" is a term contained within the taxonomic structure for "Mental/Physical Needs". Once compiled, the label groupings 401b-431b may be stored in memory. These label groupings may subsequently be used for analysing the association between multiple terms of interest, as discussed in more detail below.

For ease of explanation, FIGS. 4A-4C show each labelled term as having a single taxonomic label only. For example, the term "Papaya" is labelled with the taxonomic label "Ingredients", whilst "Birthday" is labelled with the taxonomic label "Consumption Occasions". In some embodiments, the taxonomic label applied to a term will always include the broadest class in the taxonomic structure to which the term belongs. In the case of "Papaya", for example, the broadest class of the taxonomic structure is "Ingredients", whilst in the case of "Birthday", the broadest class of the taxonomic structure will be "Consumption Occasions". It will be appreciated, however, that having identified a term as falling within a particular one of the taxonomic structures, the taxonomic label applied to that term may include part or all of the hierarchy of classes to which that term belongs. For example, the term "Papaya" is included within the class of "Tropical Fruits", itself a sub-class of "Ingredients". Thus, in some embodiments, the label for the term "Papaya" may include both "Tropical Fruit" and "Ingredients". The content analyser and/or taxonomy generator may maintain, for each one of the terms in the taxonomy, a list of the number of content items that contain that term.

As shown in FIGS. 4A-4C, the content analyser may be able to identify particular terms as falling within a class even where the precise language used is distinct from that used in the taxonomic structure. For example, the post 413a refers to "increased waist size" whilst the post 415a uses the term "slim down". Here, based on the semantic analysis provided by the NLP algorithms used to contextualise the information in the post, the content analyser is able to determine that the statements "increased waist size" and "slim down" are relevant to weight-management, and label the posts with the label for "Weight management" accordingly. It will further be appreciated from this that terms tagged as falling within a particular class in the taxonomy may have both positive and negative associations with that class. In the example above, an "increased waist size" is understood as being a direct consequence of weight-gain; the term "slim down", meanwhile, is also related to weight-management, in the sense of reversing or avoiding weight gain. In both cases, the language used in the post is understood as being associated with the "Weight-management" class in the taxonomy, albeit in different ways.

Figure 5:
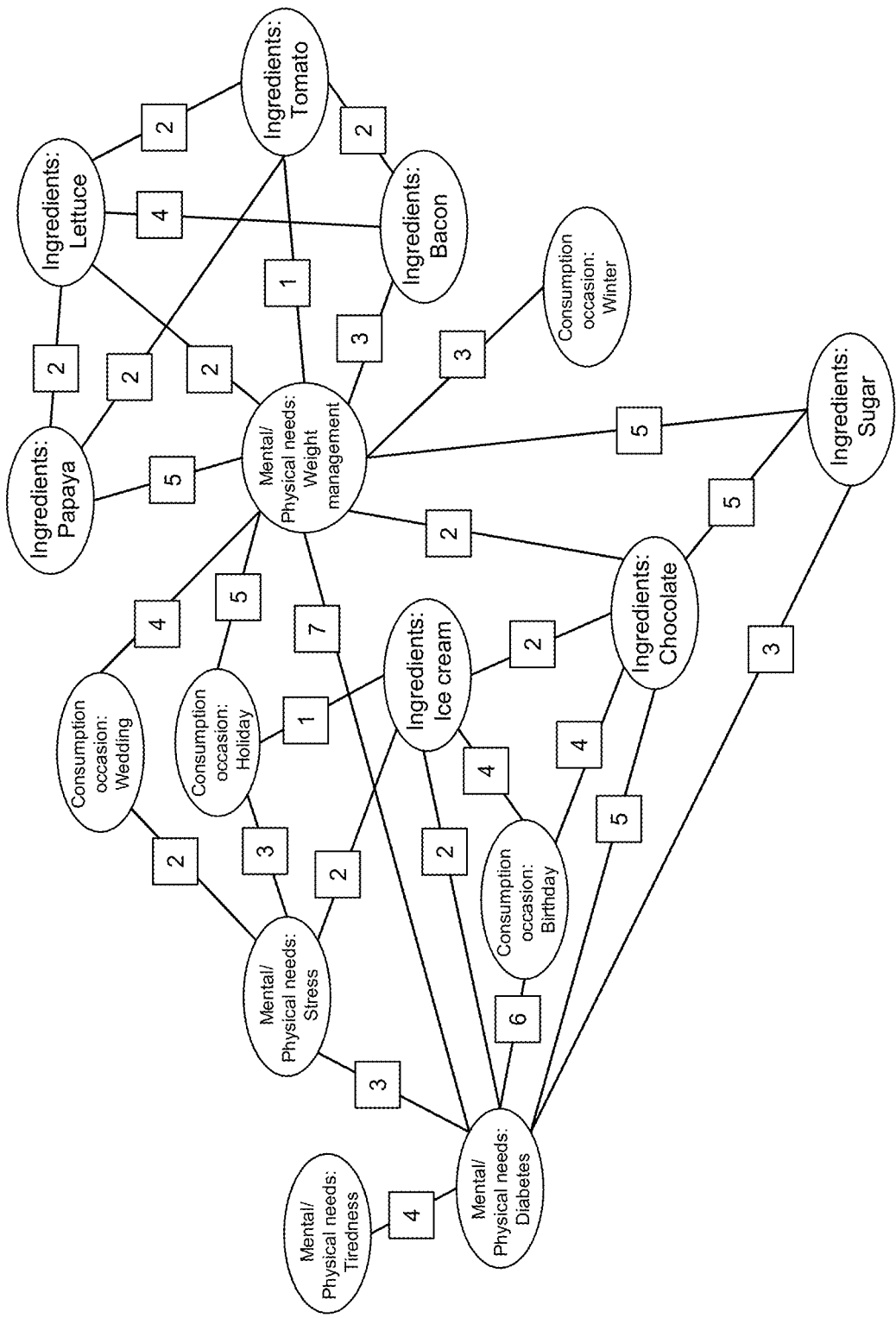
FIG. 5 shows an example of a knowledge graph generated using the content items of FIGS. 4A-4C.

FIG. 5 shows an example of how the information contained in the elements 401b-431b, as compiled from the posts 401a-431a, can be used to construct nodes in a knowledge graph. Here, each node in the graph comprises a term in one of the taxonomic structures, which might be used to label one or more of the content items. A node is connected to other nodes with which that term is deemed to be associated, based on the information contained in the content items. As an example, the node for "Ice Cream", is connected to the node for "Birthday"; this reflects the fact that there are one or more posts (e.g. post 407a) that are tagged with the taxonomic label for "Ice Cream" and which are also tagged with the label for "Birthday". Similarly, there exist posts (e.g. 411a) that are tagged with the taxonomic label for "Ice Cream" and which are also tagged with the label for "Holiday"; hence the nodes for "Ice Cream" and "Holiday" are also connected by an edge in the knowledge graph.

The strength of the association between each pair of connected nodes will vary depending on the frequency with which different terms appear alongside one another in different posts. Referring to FIGS. 4A-4C, it can be seen that two posts 407a, 425a are tagged with both the label for "Chocolate" and the label for "Birthday", whilst only one post 407a is tagged with "Chocolate" and "Ice cream". The higher rate of co-occurrence of the labels "Chocolate" and "Birthday" suggests that "Chocolate" is more strongly associated with "Birthday" than it is with "Ice Cream". (Here, it will be appreciated that FIGS. 4A-4C are provided by way of illustration, and in practice, the sample size of content items will be far larger, such that statistically relevant differences in the rates of co-occurrence can be observed).

In generating the knowledge graph, the knowledge graph generator will determine, for each pair of nodes, an association score that is based at least in part on the number of times that words or terms having those labels appear together in the same content item. In FIG. 5, the association score is shown for each edge in the graph; it can be seen, for example, that the higher rate of co-occurrence of the labels "Chocolate" and "Birthday" is reflected by a higher association score of "4" compared to the association score of "2" for the nodes "Chocolate" and "Ice Cream".

It will be appreciated that the association score for a pair of nodes in the knowledge graph may be computed in a number of different ways. In one example, it may be calculated as the number of content items that include the taxonomic labels for both of the nodes in the pair. In some embodiments, the association score for each pair of nodes may also reflect how strongly those terms are associated with one another within the individual content item(s). For example, a user might post that "I love chocolate ice cream", whilst another user may post "My friend's favourite food is chocolate, but my favourite food is ice cream". Since both sentences include the terms "chocolate" and "ice cream", both will contribute to the association score for the pair of nodes "Chocolate" and "Ice Cream" in the knowledge graph. However, the second sentence will contribute a smaller value to the association score for the two nodes than the former, since the terms "chocolate" and "ice cream" are more weakly associated with each other in that sentence, compared to the first.

In some embodiments, the association score may take into account not only the number of times those terms appear in conjunction with each other, but also whether or not the terms are understood as having a positive or negative influence on each other. FIG. 6 shows an example of association scores between a node for "Diabetes" and other nodes connected to the node for "Diabetes" (namely, the nodes for "Weight management", "Sugar" and "Stress"). Here, the "Number of Hits" specifies the number of media content items that include the labels for the two nodes in each pair ("Diabetes" and "Weight Management"; "Diabetes" and "Sugar"; and "Diabetes" and "Stress"). The Number of Hits may be broken down into examples of "Positive", "Negative" and "Neutral Association". Two labels may be recorded as having a "Positive" association if the media content item suggests that one element has a positive impact on the other, whilst a negative association score would mean that the converse is true; for example, the sentence "weight-gain is bad for diabetes" would be recorded as co-occurrence of "Weight-management" and "Diabetes", having a negative association. The association score might be calculated using one of a number of different functions. In the example shown in FIG. 6, the association scores are obtained by doubling the score for "Positive" hits and adding the scores for the "Neutral" and "Negative" hits; it will be appreciated that is purely by way of example and in practice, the final association score may be generated in a number of different ways, by preferentially biasing towards both positive or negative associations, depending on the type of trends that a user wishes to consider.

An example of how the knowledge graph of FIG. 5 may be probed so as to help in developing/designing new product concepts or renovating pre-existing product concepts will now be described. Referring back to FIG. 1, a product or concept developer (hereinafter, "developer") may interact with the knowledge graph through use of the user interface 107. To do so, the developer may first log into an account that stores a list of current and past projects, where each project pertains to a different product concept, for example. The developer may choose to create a new project flow or continue working on an existing one.

In one example, the developer may start by considering and creating a product concept that can be targeted towards people with diabetes. FIG. 7 shows an example of the results returned from the knowledge graph of FIG. 5 when entering the term "Diabetes" as a filter. By entering "Diabetes" as a filter, the system enables the user to view the terms in the knowledge graph that are most strongly associated with "Diabetes" by virtue of what is being said in the library of content items. For example, the user interface may display the top n terms as ranked by the strength of their association score with "Diabetes", where n is a number specified by the product or concept developer e.g. 10, 20, 50 etc.

In the example shown in FIG. 7, the results are grouped into three categories: "Ingredients", "Consumption Occasions" and "Mental/Physical Needs", which are the same concept dimensions as shown in FIGS. 4A-4C and the taxonomic structures shown in FIG. 3. In effect, the labels that are returned from the knowledge graph ("Chocolate", "Birthday", "Tiredness" etc.) and which are displayed alongside the indication of their association scores with "Diabetes", are sorted into separate groups, based on the broadest class of labels to which they each belong ("Ingredients", "Consumption Occasions", "Mental/Physical Benefits").

Still referring to FIG. 7, it can be seen that the category "Ingredients" returns a large result for "Chocolate", a smaller result for "Sugar" and a still smaller result for "Ice Cream". The size of each bar indicates the association score between the node for the term "Diabetes" and the respective nodes for the terms "Chocolate", "Sugar" and "Ice Cream". For example, the size of the bar may be equal or proportional to the association score. It will further be appreciated that whilst the results are portrayed in FIG. 7 as a bar-chart, this is by way of example only and a number of different chart formats may be used, including but not limited to pie charts, column charts etc. Each of these labels appears in the graph for "Ingredients" because it is recognised that they represent terms within the taxonomic structure for "Ingredients". In a similar fashion, the graph for "Consumption Occasions" shows a strong association score for "Diabetes" and "Birthday", whilst the graph for "Health" shows a strong association score for "Diabetes" and "Weight management", with smaller association scores for "Diabetes" and "Tiredness", and "Diabetes" and "Stress". It will be seen from this, a query comprising a term from a particular taxonomic structure, such as the taxonomic structure for "Ingredients", may bring up results both from that same taxonomic structure, and other taxonomic structures. For example, a query comprising the term "Kale" (an ingredient) may return "lemon" (i.e. another type of ingredient) as well as "Diabetes" (i.e. a term contained within a taxonomic structure that is comprised of terms associated with Health and Physical Benefits).

FIG. 8 shows how the product or concept developer may further navigate the knowledge graph by including "Weight management" as an additional filter (i.e. by selecting "Diabetes" OR "Weight Management" as the query). By doing so, the "Ingredients" graph is caused to display labels that are associated with either "Weight management" or "Diabetes" in the knowledge graph. Thus, in addition to "Chocolate", "Sugar" and "Ice Cream", the "Ingredients" graph now includes "Papaya", "Lettuce", "Bacon" and "Tomato". Similarly, the "Occasions" graph now includes the labels "Holiday", "Wedding" and "Winter". Since "Weight-management" is not associated with other labels besides "Diabetes" in the "Health" class, the graph for "Health" does not include any further labels compared to FIG. 7, although "Weight management" is now removed from that graph.

In some instances, the product or concept developer may formulate the query using an "AND" statement (e.g. "Diabetes" AND "Weight Management"). In this case, the system will need to identify content items that include both of these labels, and then output other labels that appear within those same content items. The system can easily do so by referring to the collection of label groupings 401b-431b. The system first identifies those label groupings that include both the label for "Diabetes" AND the label for "Weight Management" (in the example shown in FIGS. 4 and 5, this would return the label grouping 421b). The content analyser can now determine which other terms are present in, or associated with, the content item 421a from which that label grouping 421b is derived. In this way, the content analyser may identify "Chocolate" and "Sugar" as output terms for the query, since these terms both appear in at least one content item that has both the taxonomic labels "Diabetes" and "Weight Management". Thus, by labelling each original content item with a set of taxonomic labels, and storing the respective label groupings in memory, the system is able to quickly and easily return results to queries comprising more than one term.

It will further be appreciated that the query input to the user interface by the product or concept developer need not itself be one of the taxonomic labels. In the event that the product or concept developer enters a term that is not contained within one of the taxonomic structures, the system will return to the original set of input content items and filter those items to identify ones that contain that term. The system will then determine the taxonomic labels that appear most frequently in the label groupings for the filtered content items. As an example, the product or concept developer might enter the term "Cinema", which itself is not contained within one of the taxonomic structures. In that case, the system will filter the original set of content items to identify all the content items including the term "Cinema", and review the label groupings associated with the filtered set of content items. The system may determine that a large number of those label groupings include the taxonomic labels "Confectionary", "Popcorn" and "Christmas". The system may then display those labels as results for the product or concept developer's query. The same will also be true for e.g. countries or geographical location—the product or concept developer may type in the name of a country or geographical location and the system will filter the content items to determine the labels that appear most frequently in association with that country or geographical location.

The results so obtained in FIG. 8 can be useful in helping a product or concept developer to conceive and develop new ideas for products/product concepts that align with current consumers' needs as suggested by what is being said in the various different content streams. As an example, the product or concept developer may have begun by looking at "Diabetes" and having done so identified an association between "Diabetes" and "Weight management". Whilst some of the ingredients that came up when searching for "Diabetes" (for example, "Chocolate" and "Sugar") might also have been predicted to overlap with "Weight-management", the product or concept developer might be more surprised to see the label "Papaya" returned when adding in the filter "Weight management". The product or concept developer might use this to look further into the relationship between "Weight management" and "Papaya", and view some of the underlying posts supporting that relationship, such as those shown by elements 415a of FIGS. 4B and 429a of FIG. 4C. The product or concept developer might understand from this that people are talking about papaya as being useful for managing weight. Knowing that chocolate is a highly desirable product for consumers, the product or concept developer might use the insights obtained from the knowledge graph to conceive of a concept consisting of chocolate-based product that is suitable for diabetics and which has papaya extract or papaya pieces. In a further example, the product or concept developer may note the association between "Weight management" and "Winter", and consider developing a product concept that will have particular appeal for that time of year, such as hot-chocolate with papaya extract.

In order to further assist the product or concept developer in identifying developing trends in associations, the knowledge graph may not only include information concerning the associations between different words and phrases, but further maintain a record of how the association scores change over time. In the example above, the knowledge graph might show that the association score for "Weight-management" and "Papaya" had a first value 12 months ago but has since seen a sharp rise to a second, much higher value, in the last 2-3 months. The change in association score over time may be presented in the user-interface in the form of a graph that can be easily interpreted by the product or concept developer, and used to support a decision to progress with developing a product embodying those properties.

In some embodiments, having identified particular associations between terms using the system, the product or concept developer may use these to construct a product concept, an example of which is shown in FIG. 9. The product concept includes an "Insight", which sets the background against which the product is being developed (in essence, the "problem" that the developer wishes to solve with the new product). The concept further includes the "Product Description" and "Benefits", which define the nature of the product, and the "Reason to believe", which offers support as to why the product is likely to meet consumers expectation and to succeed in solving the problem, including in a particular market. FIG. 9 shows an example in which the results from FIG. 8 have been used to identify an association between papaya and weight management; this is then coupled with the desire to provide a chocolate product suitable for diabetics. Thus, the results output by the system can be used by the product or concept developer to conceive of a hot chocolate product that is suitable for diabetics and which can help with weight-management.

In some cases, the process of constructing the product concept based on the output in the user interface may be automated, for example by using one or more generative algorithms built around a large-language model (LLM); the product or concept developer may select a list of associated terms as provided in the output to their query and input these to the LLM, with an instruction to generate one or more paragraphs of text and/or pictures describing the product concept that will be the output of the LLM. The product or concept developer may be provided with the option to change certain parameters of LLM to customize the output of the LLM in a desired format and content. As an example, the product or concept developer might consider changing the degree of randomness (or temperature) of the LLM i.e. the extent to which the LLM is constrained by the specific terms output from the knowledge graph when generating the text. Alternatively, or in addition, the product or concept developer may vary the type of prompts used when instructing the LLM to generate the text. The product concept may thereafter be iteratively refined by the product or concept developer, working in combination with the LLM. Examples of suitable LLMs include GPT 3.5, GPT-4, BARD, LLaMA, Falcon, Cohere, PaLM. Claude V1 and the like.

Accordingly, the embodiments described herein can provide tools for concept development, designing or renovation allowing product or concept developers to obtain new insights from available data sources, and translate these insights into new product concepts. By doing so, embodiments can enhance and accelerate the process for generating new concepts or prototypes that resonate with people's current needs in a more data driven fashion.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A computer-implemented method for facilitating the creation of food and/or beverage product concepts, the method comprising:
    providing a plurality of content items obtained from one or more sources, each content item comprising structured or unstructured text, at least one of the content items comprising text that pertains, at least in part, to one or more food and/or beverage products;
    assigning, to each content item, one or more taxonomic labels, wherein each label comprises a term contained in a pre-defined taxonomy of terms and each label assigned to a respective content item is selected based on the particular language used in the respective content item;
    receiving, from a user, a query specifying a first term;
    in the event that the first term comprises a taxonomic label from the pre-defined taxonomy of terms;
    identifying one or more pairs of terms, each pair of terms comprising the first term and a respective other one of the taxonomic labels;
    determining, for each pair of terms, an association score, wherein the association score is based at least in part on the number of content items that have been assigned both of the taxonomic labels in the pair; and
    outputting, in a user-interface, a response to the query, wherein the response provides an indication of the association score(s) for each pair of terms.

2. The computer-implemented method according to claim 1, wherein in the event that the first term in the query does not comprise one of the taxonomic labels in the pre-defined taxonomy, the method comprises:
    identifying one or more of the content items to which the first term is relevant, based on the particular language used in the respective content item;
    identifying one or more pairs of terms, each pair of terms comprising the first term and a respective one of the taxonomic labels;
    for each pair of terms, determining an association score, the association score being based at least in part on the number of content items to which the first term has been identified as relevant and which have been assigned the taxonomic label contained in the pair; and
    outputting, in the user-interface, a response to the query, wherein the response provides an indication of the association score(s) for each pair of terms.

3. The computer-implemented method according to claim 1, comprising identifying, for each of the taxonomic labels, a broadest class of terms in the pre-defined taxonomy to which the taxonomic label belongs;
    wherein when outputting the response to the query, the taxonomic labels in each pair of terms are sorted into groups based on the larger class of labels to which they belong.

4. The computer-implemented method according to claim 1, wherein the pre-defined taxonomy comprises a plurality of taxonomic structures, each structure comprising a hierarchy of terms, wherein the terms in the respective taxonomic structures pertain to one or more of:
    Ingredients;
    Consumption Occasions;
    Mental or physical needs;
    Product Formats;
    Packaging Formats;
    Sensory Characteristics; and
    Geographical locations.

5. The computer-implemented method according to claim 1, wherein the response includes, for each taxonomic label contained in a respective one of the pairs of terms, both an indication of the taxonomic label and the association score between the label and the first term.

6. The computer-implemented method according to claim 1, comprising:
    constructing a knowledge graph, wherein the knowledge graph comprises two or more nodes and one or more edges, each node being associated with a respective label in the pre-defined taxonomy of terms, each edge connecting a respective pair of nodes whose labels are both applied to a same one of the content items, each edge indicating the association score for the labels associated with the nodes in the pair;
    wherein outputting the response to the query comprises identifying a first node that is associated with the first label, and one or more other nodes that are connected to the first node by an edge; and determining the association scores for the edges connecting the first node with the one or more other nodes.

7. The computer-implemented method according to claim 1, further comprising:

receiving, from a user, a selection of one of the pairs of labels having an association score; and retrieving, for display to the user, one or more of the content items to which both labels in the pair of labels were assigned.

8. The computer-implemented method according to claim 1, further comprising:

receiving, over time, a further plurality of content items;

assigning one or more of the labels in the taxonomy to each one of the further plurality of content items; and updating the association score(s), based on the labels assigned to the further plurality of content items.

9. The computer-implemented method according to claim 8, further comprising:

outputting, for each pair of terms, an indication of a change in the association score(s) to have occurred over a defined period of time.

10. The computer-implemented method according to claim 1, wherein the plurality of content items are obtained from one or more of:

social media sites;

news websites;

blogs;

review websites;

video or picture websites;

scientific publication websites or repositories;

web forums;

internally available documentation; and bulletin board systems (BBS).

11. The computer-implemented method according to claim 1, comprising generating a product concept, in particular a food and/or beverage product concept, the product concept comprising a description of a food and/or beverage product incorporating one or more ingredients associated with the labels output in the response.

12. The computer-implemented method according to claim 11, wherein the product concept, in particular the food and/or beverage product concept, is generated at least in part using a large language model LLM, the labels output in the response being used as input to the LLM.

13. A computer system comprising one or more processors configured to carry out the method according to claim 1.

14. A computer-readable medium storing computer executable instructions that when executed by a computer will cause the computer to carry out the method according to claim 1.

* * * * *